No. 658,269. Patented Sept. 18, 1900.
W. J. LLOYD.
BACK-PEDALING BRAKE.
(Application filed Sept. 25, 1899.)
(No Model.) 2 Sheets—Sheet 1.
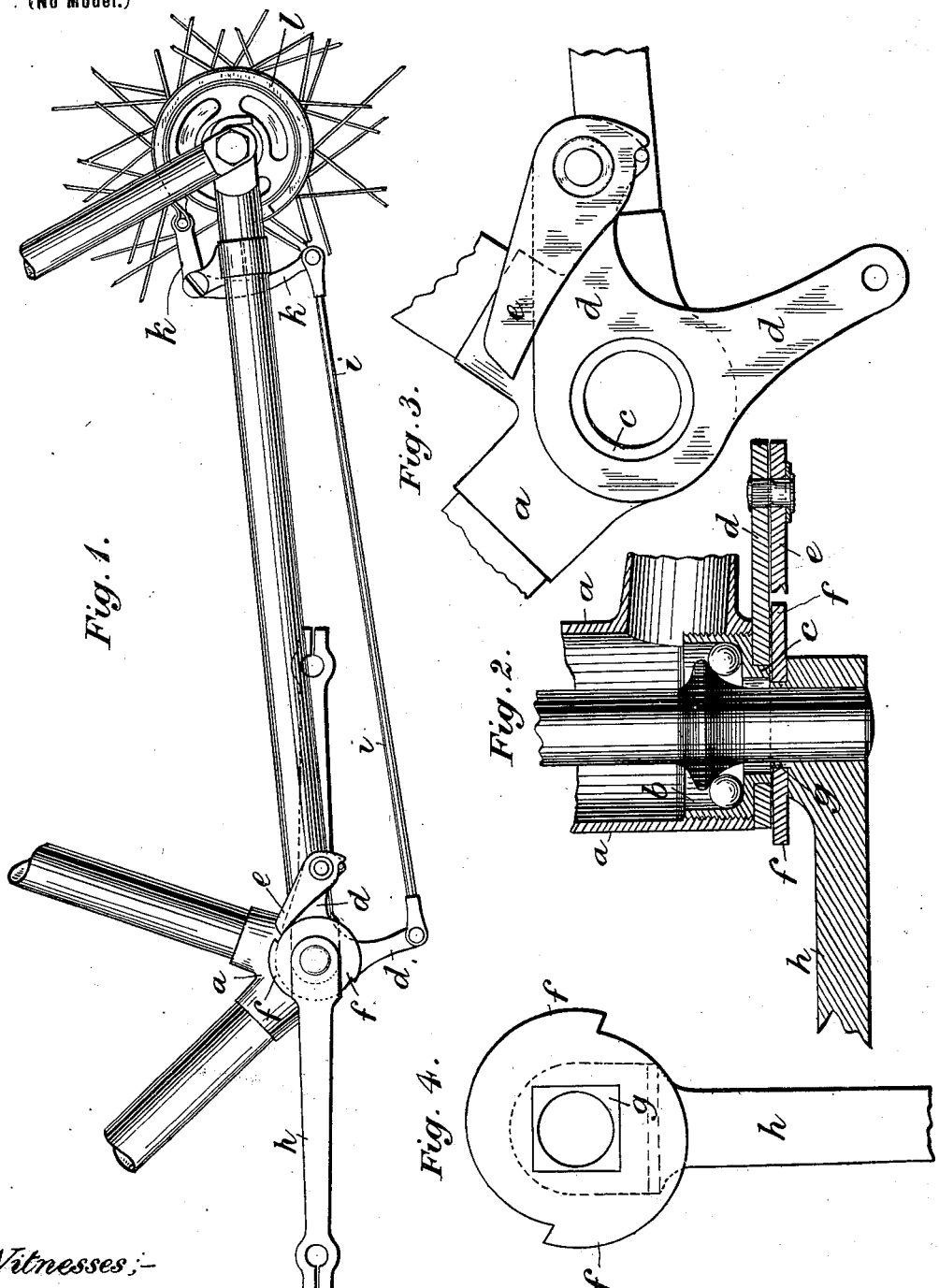
Witnesses:-
George Shaw
Richard Sperrett
Inventor:-
Walter John Lloyd

UNITED STATES PATENT OFFICE.

WALTER JOHN LLOYD, OF BIRMINGHAM, ENGLAND.

BACK-PEDALING BRAKE.

SPECIFICATION forming part of Letters Patent No. 658,269, dated September 18, 1900.

Application filed September 25, 1899. Serial No. 731,595. (No model.)

*To all whom it may concern:*

Be it known that I, WALTER JOHN LLOYD, a subject of the Queen of Great Britain, residing at Birmingham, England, have invented certain new and useful Improvements in Brake Mechanism for Velocipedes, of which the following is a specification.

My invention consists of the improvements hereinafter described in brake mechanism for velocipedes of the kind commonly called "free-wheel" velocipedes and "free-crank" velocipedes, my invention having for its object to enable the rider to put the brake in action by back-pedaling.

In carrying my invention into effect in connection with a free-wheel or free-crank bicycle I provide the hub of the rear wheel of the bicycle preferably with a band or strap brake of the ordinary construction and operate the lever for tightening and slackening the band of the band or strap brake by the construction and arrangement of parts hereinafter described and represented in the accompanying drawings.

Figure 5:
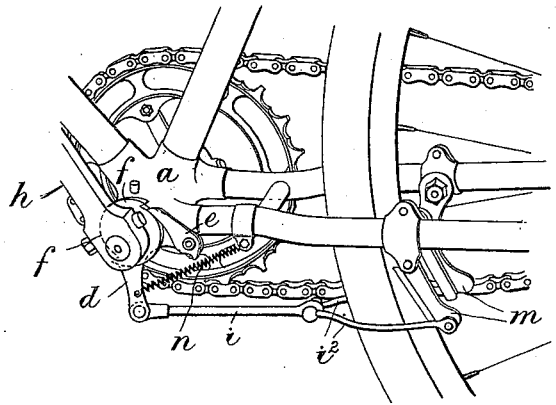
Figure 6:
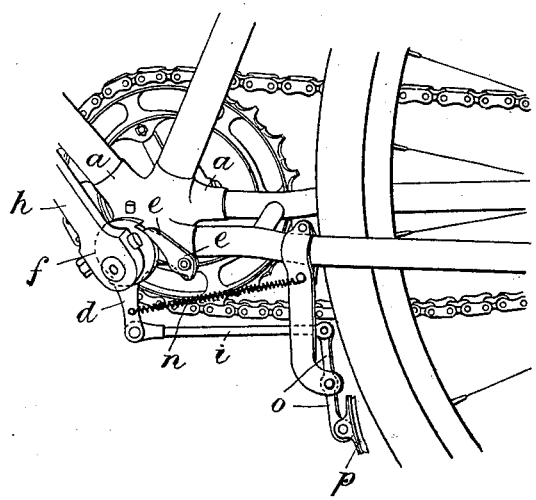

Figure 1 of the accompanying drawings represents in side elevation a portion of a safety-bicycle containing my improved brake mechism. Fig. 2 is a horizontal section of a portion of the bottom bracket of the same with the brake-operating mechanism applied thereto. Fig. 3 is an end elevation of the bottom bracket and parts carried by the same, the crank and part attached thereto being removed from the crank-axle; and Fig. 4 represents an elevation of the inner side of the detached crank and the notched or ratchet disk carried by the same. Figs. 2, 3, and 4 are drawn to a larger scale than Fig. 1. Fig. 5 is a detail perspective view illustrating my improved brake-operating mechanism applied to a bicycle the rear wheel of which is provided with a rim-brake. Fig. 6 is a similar view showing the brake-operating mechanism applied to a bicycle the rear wheel of which is provided with a tire or spoon brake.

The same letters of reference indicate the same parts in the several figures of the drawings.

$a$ is the bottom bracket of the bicycle-frame. The ball-bearing cup $b$ of the said bottom bracket has formed on its outer side a flange $c$, on which is placed, so as to be capable of free motion thereon, a bell-crank lever $d$. The upper arm of the bell-crank lever $d$ carries a pawl $e$, (see Figs 1 and 3,) the free or acting end of which rests on the periphery of a notched or ratchet disk $f$, fitted onto a square boss $g$, made on the inner side of the head of the crank $h$. The lower or downwardly-projecting arm of the bell-crank lever $d$ is connected, by means of a connecting-rod $i$, to the downwardly-projecting arm of the brake-lever $k$ of the band or strap brake $l$ on the hub of the back wheel of the bicycle.

The action of the brake mechanism is as follows: On forward pedaling the notched or ratchet disk $f$ rotates with the crank $h$, the notches of the disk $f$ passing under the pawl $e$, resting on the periphery of the said disk. On the rider ceasing to pedal the parts preserve the position represented in Fig. 1, the velocipede traveling as a free-wheel velocipede. Should the rider at any time desire to apply the brake either for stopping the bicycle or for reducing the speed of the same, he has only to commence back-pedaling, when, one of the teeth or ratchet parts of the notched disk $f$ coming in contact with the pawl $e$ effects the motion of the bell-crank lever $d$ through a small angle, the motion of the said lever $d$ being transmitted through the connecting-rod $i$ to the lever $k$, operating the brake-strap, which brake-strap consists of a steel or other metallic spring-band lined with leather or other non-metallic material. On the rider releasing the back pressure on the pedals the brake is removed from the hub of the back wheel of the bicycle.

Although I have represented my invention in connection with a band or strap brake, I wish it to be understood that I do not limit myself thereto, as other brakes may be operated by the construction and arrangement of parts described—such, for example, as spoon-brakes and rim-brakes, which act on the back wheel of the velocipede. For example, a rim-brake of the kind illustrated in Fig. 5 of the drawings may be operated by my improved brake mechanism by providing the rear end of the connecting-rod $i$ with a forked termination $i^2$ $i^2$, the branches of which are connected to the two levers $m$ $m$, constituting the rim-brake proper. The rim-brake is maintained in its normal or inoperative position and thrown off after application by a spring $n$. Further, a spoon or tire brake for the back wheel of the kind shown in Fig. 6 may be operated by my improved brake mechanism by attaching the rear end of the connecting-rod $i$ to the arm $o$ of the spoon-brake $p$. A spring $n$ for throwing off the brake is employed, as in the arrangement shown in Fig. 5.

Having now described my invention, what I claim as new, and desire to secure by Letters Patent, is—

1. The combination with brake mechanism of a free-wheel or free-crank bicycle, of a ratchet-disk fitted to rotate with the drive crank-shaft, a bell-crank lever arranged to freely oscillate about the said shaft as a center, a pawl carried by one of the arms of the bell-crank lever and resting in contact with the ratchet-disk by gravity, and means connecting the other arm of said bell-crank lever with the brake mechanism, substantially as shown and described and for the purpose specified.

2. The combination with brake mechanism for a free-wheel or free-crank bicycle, of a bell-crank lever, an outwardly-projecting flange on one of the bearing-cups of the bottom bracket for receiving said bell-crank lever, a pawl carried by one of the arms of the bell-crank lever, and a notched or ratchet disk fitted to the crank adjacent to the bell-crank lever, the several parts being arranged and operating substantially in the manner shown and described and for the purpose specified.

In testimony whereof I have hereunto set my hand in presence of two subscribing witnesses.

WALTER JOHN LLOYD.

Witnesses:
 GEORGE SHAW,
 RICHARD SKERRETT.